Oct. 8, 1957

T. HILLIS 2,809,059

REMOVABLE VALVE PACKING
Filed Oct. 12, 1956

INVENTOR.
THOMAS HILLIS,
BY
McMorrow, Berman + Davidson
ATTORNEYS

United States Patent Office 2,809,059
Patented Oct. 8, 1957

2,809,059

REMOVABLE VALVE PACKING

Thomas Hillis, Keysville, Ga.

Application October 12, 1956, Serial No. 615,684

3 Claims. (Cl. 286—33)

This invention relates generally to valve constructions and is more particularly concerned with a novel removable valve packing for a valve stem.

Incorporated on valves including a housing, a valve stem and bonnet in which the stem is guided, wherein said bonnet includes a cylindrical chamber through which the stem extends, and wherein said chamber opens into one side of the housing, is a suitable packing means in the chamber sealingly engaged about the outer periphery of the stem for preventing leakage of the valve. The packing means requires constant maintenance, and after the valve has been used, it must be replaced in its entirety. Generally speaking, the problem of replacing the packing means is awkward and time consuming.

A primary object of invention is to provide in a valve of the character set forth a removable packing assembly incorporating means whereby the packing means of the removable packing assembly may be readily exposed exteriorly of the valve housing facilitating maintenance of said packing means.

A more specific object of invention in conformance with that set forth is to provide a novel removable packing assembly incorporated in a valve of the character set forth wherein the packing assembly incorporates in the chamber through which the stem extends an abutment element disposed beneath packing means circumposed about the stem within the chamber of the valve, and means wherein said abutment element may be fixedly secured to the stem which when retracted will remove the packing means exteriorly of the valve housing.

And a still further object of invention in conformance with that set forth is to provide in a valve of the character set forth a novel removable packing assembly which is readily and economically manufactured, easily installed and maintained, and highly satisfactory, practical and acceptable for the purpose intended.

Figure 1:
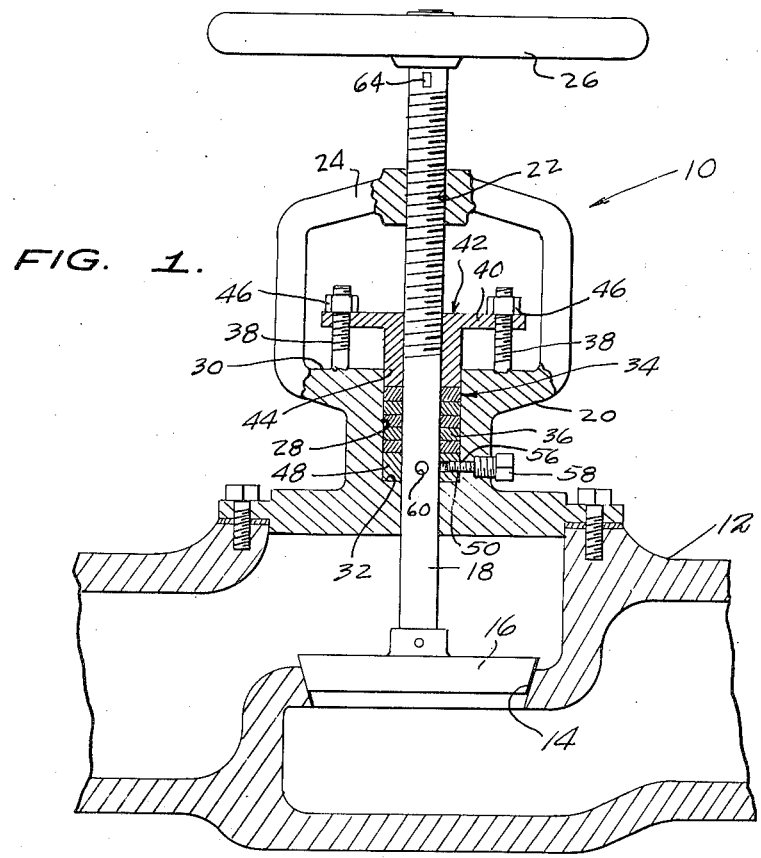
Figure 2:
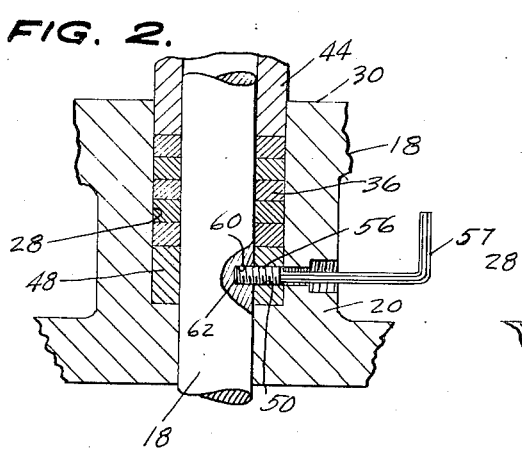
Figure 3:
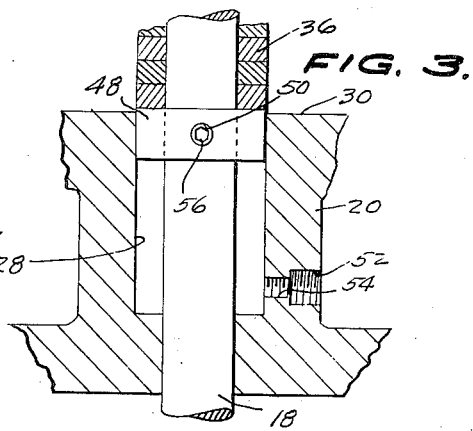

These together with other objects and advantages which will subsequently become apparent reside in the details of construction and operation as more fully hereinafter described and claimed, reference being had to the accompanying drawing, forming a part hereof, wherein like numerals refer to like parts throughout, and in which:

Figure 1 is a side elevation view of a conventional valve, incorporating the novel removable packing assembly therein, portions being broken away and shown in section for clarity;

Figure 2 is an enlarged fragmentary elevation view of a portion of Figure 1, showing the novel removable packing assembly in detail, and showing the manner in which means are utilized for facilitating the removal of the packing means of the packing assembly; and Figure 3 is a fragmentary elevation view, similar to Figure 2, showing the manner in which the packing means may be exposed exteriorly of the valve which incorporates the novel removable packing assembly.

Referring to the drawing in detail, a valve is indicated generally at 10 incorporating a body portion 12 including a conical valve seat 14 engageable with a valve head 16 suitably secured on a valve stem 18. The valve 10 incorporates a bonnet 20 being guidedly retained thereon by means of an internally threaded bore portion 22 of an overlying transverse support portion 24 and is rotated by means of a suitable transverse handle 26. The bonnet 20 incorporates a cylindrical chamber 28 through which an intermediate portion of the stem 18 extends, said chamber 28 opening into an outer surface portion 30 of the bonnet and including a seat portion 32 at its lower end.

A removable packing assembly is indicated generally at 34 incorporating packing means 36 of any suitable character, which is circumposed about an intermediate portion of the stem 18 disposed within the chamber 28, this packing means being that which must be replaced after a given interval of use of the valve.

The bonnet 20 may incorporate integral stud portions 38 suitably disposed about the open end of the chamber 28 for receiving thereon a suitable transversely apertured flange 40 of a packing gland indicated generally at 42 which incorporates an integral tubular portion 44 engageable with one side of the packing means 36. The packing gland 42 is retained on the studs 38 by suitable retaining nuts 46.

Circumposed about the stem 18 within the chamber 28 of the bonnet 20, is an annular abutment element 48 which incorporates a transverse internally threaded bore portion 50 therethrough opening toward the outer periphery of the stem 18 and the inner periphery of the chamber 28. The bonnet 20, see Figure 3, has extending transversely therethrough an internally threaded bore portion 52 which terminates in a reduced diameter internally threaded bore portion 54 intersecting the chamber 28. The bore portion 54 has rotatably disposed therein an externally threaded fastener element 56 such as an Allen screw which normally extends into the threaded bore portion 50 of the abutment element 48 during conventional use of the valve, see Figure 1. The internally threaded bore portion 52 removably receives therein a suitable plug screw 58, which may be removed providing access to the screw 56 by means of an Allen wrench 57, for example, see Figure 2.

When it is desired to remove the packing means 36 i. e. expose the same in the manner shown in Figure 3 exteriorly of the outer surface 30 of the valve bonnet 20, the fastener 56 is extended into locking engagement with the outer periphery of the stem 18, see Figures 2 and 3, for example, wherein the abutment element 48 moves with the stem 18 when the same is retracted from the bonnet 20. To facilitate the locking engagement between the abutment element 48 and the stem 18, the stem may have extending transversely through the outer periphery thereof an internally threaded bore portion 60, see Figures 1 and 2, which receives therein the end portion 62 of the fastener 56. In order to facilitate the proper alignment of the bore portion 60 with the bore portion 50 of the abutment element 48, suitable indicia means 64 may be inscribed exteriorly on the upper end of the stem 18 in longitudinal alignment with the aforementioned bore portion 60.

From the foregoing, it is readily apparent that by lockingly engaging the abutment element 48 on the stem 18, after having first loosened the packing gland 42 to permit upward movement of the same, as viewed in Figure 3, the packing means 36 may be readily exposed exteriorly of the bonnet 20 of the valve housing and accordingly be replaced in a ready and expeditious manner. After the packing means 36 have been replaced the cooperating parts of the replaceable packing assembly are disposed in the position shown in Figure 1, wherein the fastener element 56 is retracted to the position shown therein.

The foregoing is considered as illustrative only of the principles of the invention. And it is believed readily apparent that the novel replaceable packing valve assembly may be adapted on valves other than that shown in the exemplary embodiment. Further, since numerous modifications and changes will readily occur to those skilled in the art, it is not intended to limit the invention to the exact construction and operation shown and described, and accordingly all suitable modifications and equivalents may be resorted to, falling within the scope of the appended claims.

What is claimed as new is as follows:

1. In a valve including, a valve stem and a bonnet in which said stem is guided, said bonnet including a cylindrical chamber through which the stem extends, said chamber opening into an outer surface portion of the bonnet; a removable packing assembly circumposed about an intermediate portion of the stem within said chamber comprising packing means circumposed about an intermediate portion of said stem within the chamber, a packing gland detachably mounted on the bonnet and including a tubular portion circumposed about the stem in engagement on one side of the packing means, an abutment element circumposed about the stem in engagement with the packing means opposite said packing gland, a transverse bore extending through said bonnet intersecting a lower portion of the chamber, plug means removably received in the transverse bore for sealing the same, and means on said bonnet operable through said bore to engage the abutment element against movement with said stem in a first position and to lock the abutment element on the stem in a second position wherein retraction of said stem through the chamber after detachment of the packing gland exposes the packing means exteriorly of the bonnet.

2. In a valve including, a valve stem and a bonnet in which said stem is guided, said bonnet including a cylindrical chamber through which the stem extends, said chamber opening into an outer surface portion of the bonnet; a removable packing assembly circumposed about an intermediate portion of the stem within said chamber comprising packing means circumposed about an intermediate portion of said stem within the chamber, a packing gland detachably mounted on the bonnet and including a tubular portion circumposed about the stem in engagement on one side of the packing means, an abutment element circumposed about the stem in engagement with the packing means opposite said packing gland, a transverse bore extending through said bonnet intersecting a lower portion of the chamber, plug means removably received in the transverse bore for sealing the same, and means on said bonnet operable through said bore to engage the abutment element against movement with said stem in a first position and to lock the abutment element on the stem in a second position wherein retraction of said stem through the chamber after detachment of the packing gland exposes the packing means exteriorly of the bonnet, said last mentioned means comprising a screw element rotatably mounted in said transverse bore, the abutment element including an internally threaded transverse bore alignable with the first mentioned bore, the screw element including an end portion lockingly engageable with the stem for fixedly retaining the abutment element thereon.

3. In a valve including, a valve stem and a bonnet in which said stem is guided, said bonnet including a cylindrical chamber through which the stem extends, said chamber opening into an outer surface portion of the bonnet; a removable packing assembly circumposed about an intermediate portion of the stem within said chamber comprising packing means circumposed about an intermediate portion of said stem within the chamber, a packing gland detachably mounted on the bonnet and including a tubular portion circumposed about the stem in engagement on one side of the packing means, an abutment element circumposed about the stem in engagement with the packing means opposite said packing gland, a transverse bore extending through said bonnet intersecting a lower portion of the chamber, plug means removably received in the transverse bore for sealing the same, and means on said bonnet operable through said bore to engage the abutment element against movement with said stem in a first position and to lock the abutment element on the stem in a second position wherein retraction of said stem through the chamber after detachment of the packing gland exposes the packing means exteriorly of the bonnet, said last mentioned means comprising a screw element rotatably mounted in said transverse bore, the abutment element including an internally threaded transverse bore alignable with the first mentioned bore, the screw element including an end portion lockingly engageable with the stem for fixedly retaining the abutment element thereon, said stem including a transverse bore alignable with the internally threaded bore of the abutment element for removably receiving the end portion of the screw element therein.

No references cited.